United States Patent
Johnson et al.

[15] 3,659,333
[45] May 2, 1972

[54] METHOD AND APPARATUS FOR CONSTRUCTION OF MODULAR BUILDINGS

[72] Inventors: John A. Johnson; Nicholas F. Alberti; Joseph E. Schuette, all of Fort Lauderdale, Fla.

[73] Assignee: Behring Corporation, Fort Lauderdale, Fla.

[22] Filed: Apr. 9, 1970

[21] Appl. No.: 26,953

[52] U.S. Cl..............................29/471.1, 29/493, 29/497.5
[51] Int. Cl.........................................................B23k 31/02
[58] Field of Search..................228/44; 29/471.1, 493, 497.5

[56] References Cited

UNITED STATES PATENTS 2,304,976  12/1942  Watter.................................29/471.1
2,506,728  5/1950   McGrath.............................29/471.1
2,510,727  6/1950   Sussenbach.........................29/471.1
3,442,432  5/1969   Santangini..............................228/44

Primary Examiner—John F. Campbell
Assistant Examiner—Richard Bernard Lazarus
Attorney—Settle and Oltman

[57] ABSTRACT

In constructing a modular building, a floor frame and a wall frame are assembled at a right angle, with a perimeter beam of the floor frame next to the inner faces of vertical studs of the wall frame. Since the outer faces of the studs are covered by surfacing material, they are not accessible for welding, so a welder and pressure device, both mounted on the same support, are positioned to place the welder inside the perimeter beam opposite a stud and the pressure device on the outer side of the wall frame next to the surfacing material. The welder may be aligned with a stud by aiming the pressure device relative to a reference which may be fasteners in the surfacing material. The pressure device is operated to apply force to the wall frame and thus press the welder against the perimeter beam. The welder is operated to make the weld, and the sequence is repeated to make further welds. The method and the apparatus are claimed.

9 Claims, 3 Drawing Figures

PATENTED MAY 2 1972 3,659,333

INVENTORS.
JOHN A. JOHNSON.
NICHOLAS F. ALBERTI.
JOSEPH E. SCHUETTE.
BY: SETTLE & OLTMAN.
ATT'YS.

INVENTORS.
JOHN A. JOHNSON.
NICHOLAS F. ALBERTI.
JOSEPH E. SCHUETTE.
BY:
SETTLE & OLTMAN.
ATT'S.

METHOD AND APPARATUS FOR CONSTRUCTION OF MODULAR BUILDINGS

BACKGROUND OF THE INVENTION

The production of one type of modular building involves complete prefabrication of modules in a factory. Walls, roofs and floor are all fully constructed and then assembled with each other and welded to form a module or room unit.

In the welding of the floor frame to the wall frames, a problem arises because studs of the wall frame where welds are to be made are hidden from a viewer located outside the wall frame because the studs are covered by surfacing material. Although access to studs could be gained from underneath the module, as a practical matter this would require raising the whole module to allow a welder to reach the weld points.

SUMMARY OF THE INVENTION

To avoid raising an entire module in order to facilitate welding of the floor frame to the wall frames, the present invention provides a method and apparatus which enables welding of the floor frame to the studs of the wall frame without being able to see the studs. The method employs a welder and pressure device, both mounted on the same support. The welder and the pressure device are positioned respectively on opposite sides of the wall frame, the welder being located inside the perimeter beam and the pressure device being located on the outside of the wall frame next to the surfacing material thereon. The welder is preferably a welding gun of the gas-shielding type and the pressure device may be an air cylinder and piston by way of example. To line up the welder with a stud, the pressure device is aimed relative to fasteners in the surfacing material on the outside of the wall frame. The pressure device is then operated to apply force to the wall frame, as by extending the piston rod of an air cylinder, and this forces the welder against the perimeter beam opposite a stud. The welder is then operated to make a weld. The pressure device is released, and the welding device is moved to position it either to make another weld to the same stud or to make a weld at a different stud.

Accordingly, it is an object of the present invention to provide a method and apparatus for welding together members which are hidden at least on one side thereof.

Another object of the invention is to aim a welder and make a weld with the welder at members which are hidden from the view of the operator of the welder.

A further object of the invention is to position a welder at a hidden work member by aiming the welder relative to reference means and forcing the welder on the work with pressure means located remotely from the welder.

Another object of the invention is to provide a unit having a welder and a pressure means mounted on a common support with which the welder may be positioned on one side of a wall frame and the pressure means may be positioned on the opposite side of the wall frame and aimed to line up the welder with the work.

Other objects of this invention will appear from the following description and appended claims, reference being had to the accompanying drawings forming a part of this specification wherein like reference characters designate corresponding parts in the several views.

ON THE DRAWINGS

Figure 1:
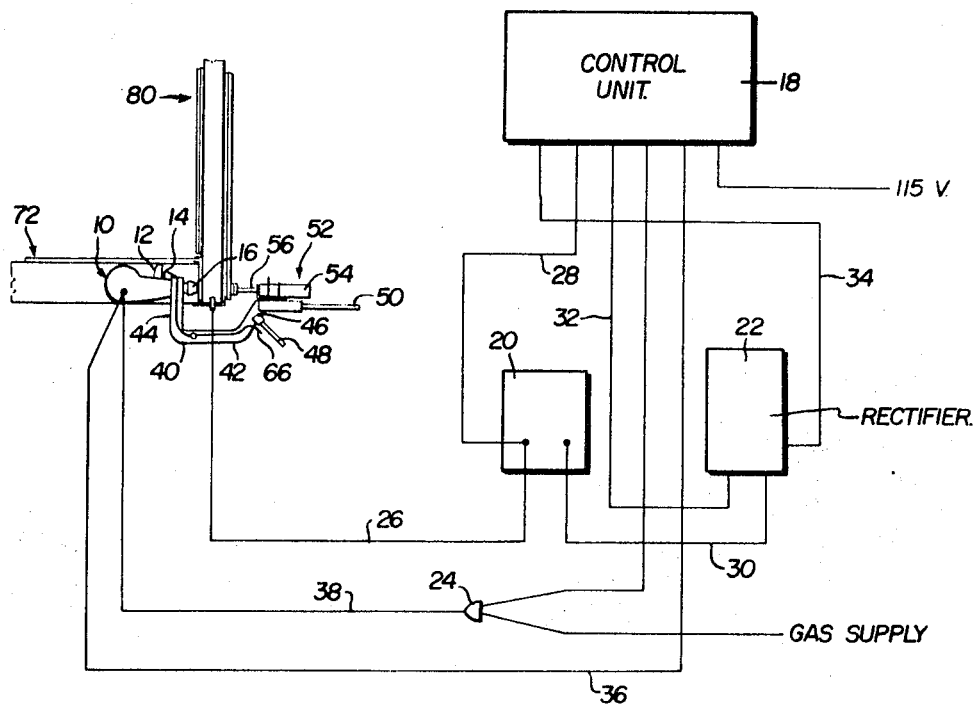
FIG. 1 is a diagrammatic view of the apparatus of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

A welding gun 10 is of the metal inert gas type in which a metal electrode is arc welded to make the weld, and the weld is shielded by inert gas directed at the weld. Welding guns of this type are commercially available, one such gun being sold under the trade designation "Millermatic." The welding gun 10 has a handle 12, a trigger 14, and a head 16 where the weld is made. The welding gun 10 is accompanied by control apparatus shown diagrammatically in FIG. 1 and including a control unit 18, a power supply 20, a feed unit 22 and a gas supply 24. One terminal of the power supply 20 is connected by lines 26 and 28 respectively to the work and to the control unit 18. These may be ground connections. The power supply 20 is connected by line 30 to a feed unit 22 which in turn is connected by lines 32 and 34 to the control unit 18. The control unit 18 is connected by line 36 to the welding gun 10, and the gas supply 24 is also connected by a line 38 which is a gas supplying line, to the welding gun 10.

The welding gun 10 contains a motor which feeds wire to the work at a controlled speed. When the trigger 14 is actuated, the electrical system of the apparatus begins a programmed operation. The gas valve in the welding gun opens to start the flow of gas from the gas supply 24. Also, the motor for feeding wire is actuated, and shortly thereafter the wire touches the work. The motor is automatically stopped, and an arc is established for a predetermined time which is the weld time. The control unit 18 automatically times the weld. The wire feed motor is energized by arc voltage to feed wire continuously during the weld time, the wire being shielded by the inert gas supplied from gas supply 24. After a predetermined time, the arc is extinguished marking the completion of the weld.

The welding gun 10 is mounted on a support 40 which in this case is in the form of a clevis or U-shaped structure having a base 42 and arms 44 and 46. There is a handle 48 affixed to arm 46, and a second handle 50 at the end of arm 46. Affixed to handle 50 is a pressure device 52 which in this embodiment is an air cylinder and piston device. Other forms of pressure applying devices such as a solenoid or hydraulic cylinder could be used. The device 52 includes an air cylinder 54 having an internal piston connected to a rod 56 having a pad 58 on the free end thereof. The pad 58 may have resilient material 60 affixed to it to protect the work. The cylinder 54 may be clamped to the handle 50 as by U-bolts 62 and 64. The pressure device 52 is directly opposite the head 16 of the welder.

To facilitate actuation of the trigger 14 remotely from the welder, a second or auxiliary trigger 66 is pivotally mounted on the support 40. The trigger 66 is an elongated rod which follows along the clevis 40 from the trigger 14 to the handle 48, the pivot point being at a pin 68 extending through an enlarged portion of the auxiliary trigger. The end 70 of the auxiliary trigger contacts the welder trigger 14, so when the portion of the trigger 66 next to the handle 48 is pulled upwardly as viewed in FIG. 3, the far end 70 pushes against the trigger 14 and actuates it.

The method of the invention is carried out in one embodiment to weld a floor frame to a wall frame in the construction of a module for a building. As shown in the drawings, the floor frame 72 has metal joists 74 connected at their ends to a perimeter beam 76. The connection of the joist to the perimeter beam 76 may be done by welding, but this welding is carried out as a part of the fabrication of the floor frame prior to the welding method with which the present invention is concerned. The floor frame 72 has floor panelling 78 on its upper side.

The wall frame 80 includes vertical metal studs 82 in the form of channels connected as by welding at their bottom ends to a sill member 84 which may also be a metal channel. The upper ends of the studs 82 are connected to another channel which is not shown. Two layers of panelling 86 and 88 are affixed to the inside faces of the studs 82, and this panelling extends down almost to the floor panelling 78. Layers 86 and 88 may be gypsum board. On the outside faces of the studs 82, layers 90 and 92 of surfacing material such as rockboard are affixed to the studs 82 as with vertical rows of screws 94. The surfacing material 90, 92 extends fully to the bottom of the wall frame 80, so at the bottom of the wall frame, the studs 82 as well as the perimeter beam 76 are hidden from the view of a person located on the outer side of the wall frame 80.

Figure 2:
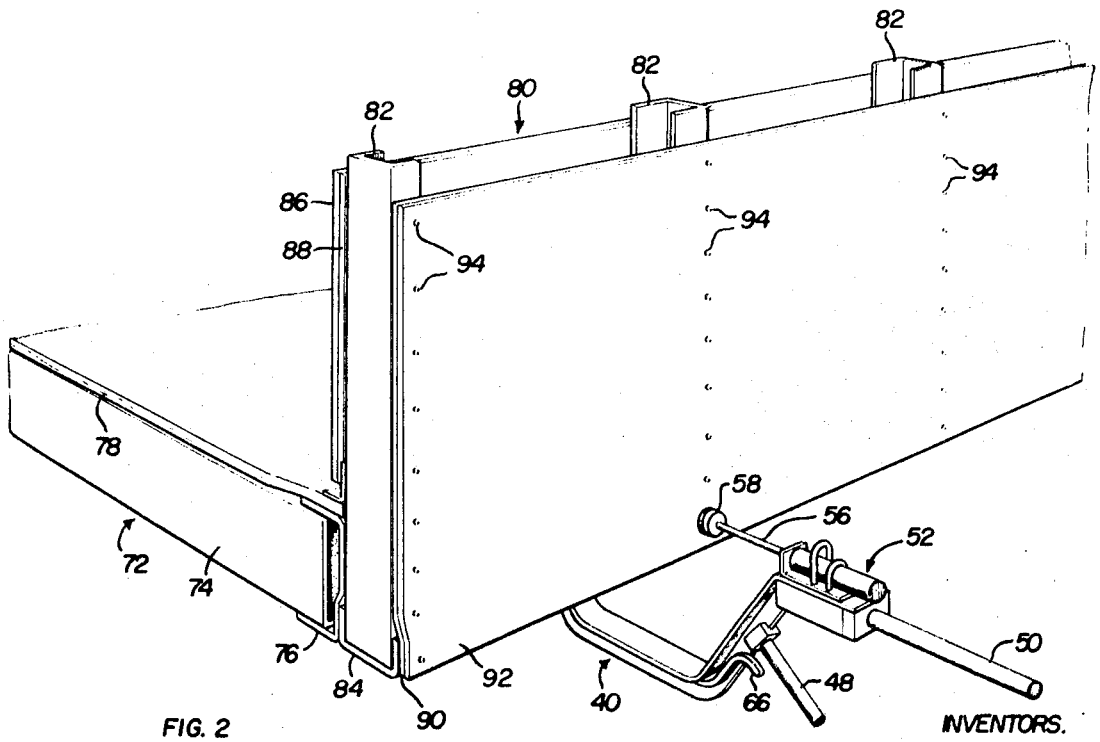
FIG. 2 is a fragmentary perspective view illustrating the positioning of the welding apparatus relative to a floor frame and a wall frame in the making of a weld.

The first step of the method is to assemble a floor frame 72 with the wall frame 80 by positioning the perimeter beam 76 next to the inside faces of the studs 82 adjacent the sill 84. The floor frame 72 is at a right angle to the wall frame 80 in this position, as shown in FIGS. 1, 2 and 3.

Figure 3:
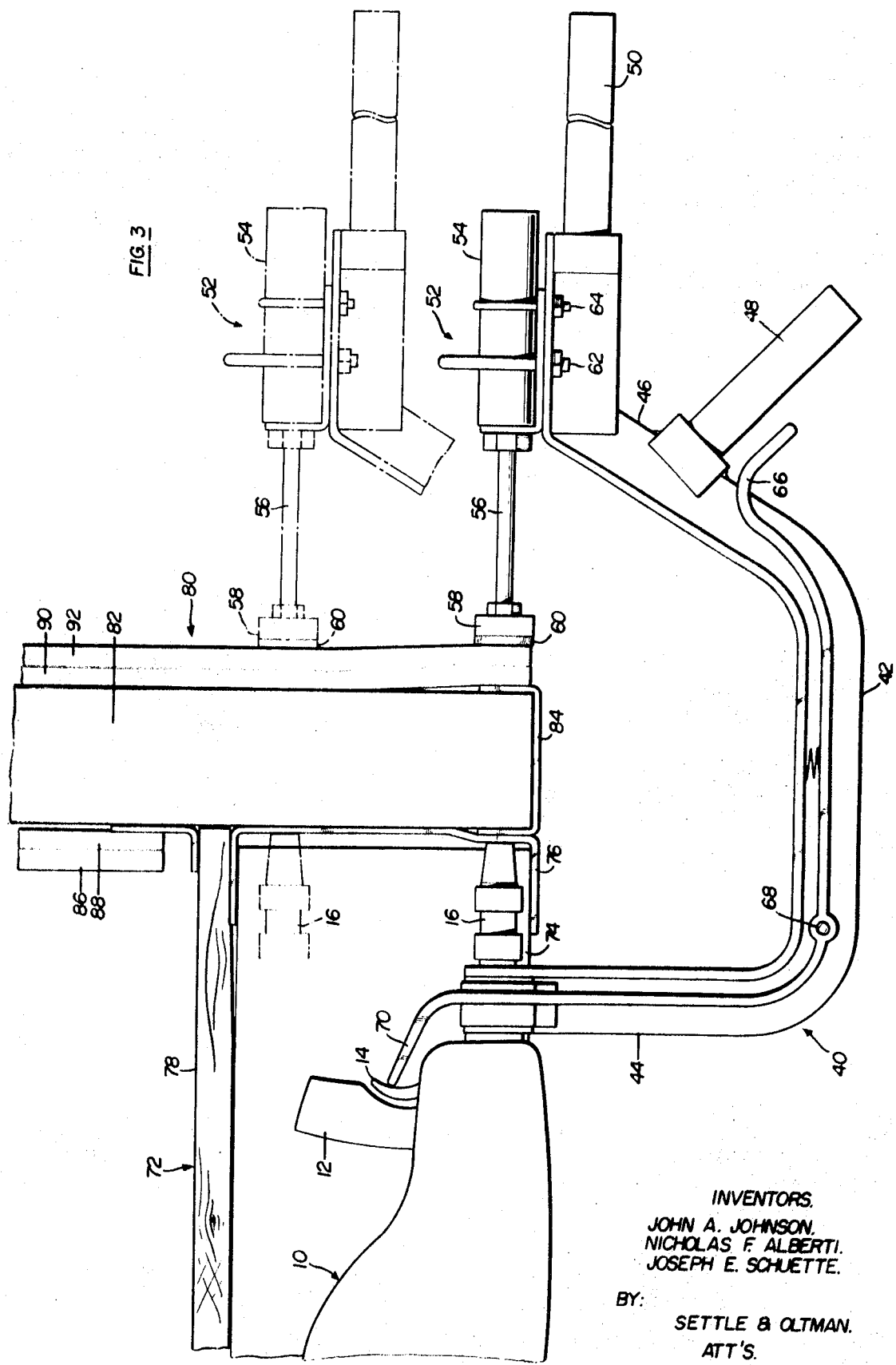
FIG. 3 is an enlarged view, partially in section, showing the positioning of the apparatus as a weld is made.

The support 40 with the welder 10 and the pressure device 52 affixed to it is positioned under the wall frame 80 to place the head 16 of the welder 10 next to the perimeter beam 76 on the inner side of the studs 82 and also to place the pressure device 52 opposite the welder on the outer side of the wall frame 80, all as shown in FIG. 3.

The welding gun is positioned opposite one of the studs 82 by lining up the pressure device 52 with the screws 94 which fasten the surfacing material 90, 92 to that particular stud. The pressure device 52 is shown lined up with a particular line of screws in FIG. 2, so that it is apparent that the screws are used as a reference for alignment of the welder with a particular stud. Some other reference could be used but the screws are the most convenient reference.

Next, the pressure device 52 is actuated to extend the piston rod 56 and force the pad 58 against the material 92 on the wall frame 80. The pad applies pressure to the wall frame, and due to reaction, device 52 applies force in a direction away from the wall frame to the handle 50 which pulls the head 16 of the welding gun 10 against the perimeter beam 76 directly opposite one of the studs 82 as shown in FIGS. 1 and 3.

Next the trigger 66 is pulled to in turn actuate the trigger 14 and operate the welder through its automatic welding sequence. The welding sequence has been described previously and will not be repeated. It may be noted, however, that where the perimeter beam and the studs and the sill 84 are galvanized steel, it has been found desirable to use wire in the welding gun of a silicon bronze alloy and a shielding gas of argon. Strong welds between the perimeter beam 76 and the studs 82 can be made in this manner.

After the weld is made, the pressure device 52 is released, and the unit 40 is repositioned. A changed position for the welding head 16 and the pressure device 52 along with part of the support 40 is shown in FIG. 3 in broken lines. In this case, the welder has been moved up, but remains in alignment with the same stud so as to make another weld to the same stud. For a particular embodiment, it has been found desirable to make three welds between the perimeter beam 76 and any given stud 82, these welds being lined up vertically. Then the welder is shifted to line up with another stud 82 and three more welds are made. However, it will be understood that the method is applicable where only a single weld is made to each stud.

Thus, the invention provides a method and apparatus for welding together members which are at least partially hidden utilizing a welder and a pressure device located respectively on opposite sides of the work. For alignment purposes, the pressure device is aligned with a reference on the covered side of the work, and this positions the welder at the appropriate place on the opposite side of the work. The welder is forced against the work by the pressure device. The welding is actuated by means of a trigger which itself is operated remotely from the welder. There is no need to weld from an awkward position underneath the work or lift the whole module to allow access under the work.

Having thus described our invention, we claim:

1. A method of welding a horizontal floor frame to a vertical wall frame in the construction of a module for a building utilizing a welder and a pressure means both mounted on a support, said method comprising the steps of:
   a. assembling a floor frame having horizontal joists connected to horizontal perimeter beams with a wall frame having vertical weldable studs connected to a horizontal sill by placing a horizontal weldable perimeter beam of the floor frame next to an inward side of the studs at said sill, the inward side of the studs being the side facing the floor frame, the outward side of said wall frame being covered with surfacing material so that said studs and said perimeter beam are not visible from the outward side,
   b. positioning said support under said sill to place said welder at said perimeter beam on the inward side of said studs and said pressure means on the outward side of said wall frame,
   c. applying pressure to said wall frame with said pressure means so that said pressure means acts on said support to force said welder against said perimeter beam opposite one of said studs,
   d. welding said perimeter beam to said one stud with said welder,
   e. releasing said pressure means, and
   f. repositioning said welder to make a further weld.

2. The method as claimed in claim 1 in which said step (f) is carried out by positioning said welder to make a further weld to the same stud.

3. The method as claimed in claim 1 in which step (f) is carried out by positioning said welder to make a further weld to a different stud.

4. A method of welding a horizontal floor frame to a vertical wall frame in constructing a module for a building utilizing a welder means and a hook-shaped support, said welder means being at the tip of a hook portion of said support and said support having a handle portion at the other end thereof, said method comprising the steps of:
   a. assembling a floor frame having horizontal joists connected to horizontal perimeter beams with a wall frame having vertical weldable studs connected to a horizontal sill by placing a horizontal weldable perimeter beam of the floor frame next to an inward side of the vertical studs at said sill, the inward side of the studs being the side facing the floor frame, the outward side of said wall frame being covered with surfacing material so that said studs and said perimeter beam are not visible from that outward side,
   b. positioning said support under said sill to place said welder means at said perimeter beam on the inward side of said wall frame and said handle portion on the outward side of said wall frame,
   c. further positioning said support laterally of said beam to align said welder means with one of said studs,
   d. applying force to said handle portion in a direction away from said wall frame to force said welder means against said perimeter beam opposite one of said studs,
   e. welding said perimeter beam to said one stud with said welder means,
   f. releasing said force,
   g. shifting said support and welder means relative to said one stud to make a further weld between said beam and the same stud, and subsequently
   h. repositioning said support to align said welder means with another stud.

5. A method of welding a horizontal floor frame to a vertical wall frame utilizing a welder and a pressure means both mounted on a hook-shaped support, the welder being mounted at the tip of a hook portion of said support and the pressure means being mounted on a handle portion at the opposite end of said support, the weld point being hidden at one side of the work, said method comprising the steps of:
   a. assembling a horizontal floor frame having joists connected to perimeter beams with a vertical wall frame having weldable studs connected to a sill by placing a horizontal weldable perimeter beam of the floor frame next to an inward side of the vertical studs adjacent said sill, the inward side of the studs being the side facing said floor frame, the outward said of said wall frame having surfacing material attached to said studs with fasteners which are visible but the studs being hidden from that outward side, b. positioning said support under said sill to place said welder at said perimeter beam on the inward side of said wall frame and said pressure means on the outward side of said wall frame, c. further positioning said support laterally of said beam to align a portion of said pressure means relative to selected fasteners and thus align said welder with one of said studs, d. applying pressure to said wall frame with said pressure means with said pressure means acting on said handle to force said welder against said perimeter beam opposite one of said studs, e. welding said perimeter beam to said one stud with said welder, f. releasing said pressure means, and g. repositioning said welder to make a further weld.

6. A method of welding a horizontal floor frame to a vertical wall frame in the construction of a module for a building utilizing apparatus having a handle and a hooked portion with welding means at the tip thereof, said method comprising the steps of:

a. assembling a horizontal floor frame having horizontal joists connected to horizontal perimeter beams with a vertical wall frame having vertical weldable studs connected to a horizontal sill by placing a horizontal weldable perimeter beam of the floor frame next in an inward side of the vertical studs at said sill, the inward side of the studs being the side facing said floor frame, the outward side of said wall frame being covered with surfacing material so that said studs and said perimeter beam are not visible from that side, b. positioning said hooked portion of said apparatus under said sill to place said welding means at said perimeter beam on the inward side of said wall frame and said handle on the outward side of said wall frame, c. applying force to said handle in a direction away from said wall frame to pull said welding means against said perimeter beam opposite one of said studs, d. welding said perimeter beam to said one stud with said welding means, e. releasing said force, and f. repositioning said apparatus to make a further weld.

7. The method as claimed in claim 6 in which said step (f) is carried out by positioning said welding means to make a further weld to the same stud.

8. The method as claimed in claim 6 in which step (f) is carried out by positioning said welding means to make a further weld to a different stud.

9. The method as claimed in claim 6 in which said welding means is aligned with said one stud by aiming said apparatus relative to a fastener which is visible on the said opposite side of the wall frame.

* * * * *